United States Patent [19]

Göbel et al.

[11] Patent Number: 4,637,500
[45] Date of Patent: Jan. 20, 1987

[54] HYDRODYNAMIC COUPLING WITH SERIALLY ARRANGED DAMPER UNITS

[75] Inventors: Hilmar Göbel, Schwebenried; Harald Raab, Schweinfurt, both of Fed. Rep. of Germany

[73] Assignee: Fichtel & Sachs AG, Schweinfurt, Fed. Rep. of Germany

[21] Appl. No.: 494,769

[22] Filed: May 13, 1983

[30] Foreign Application Priority Data

May 14, 1982 [DE] Fed. Rep. of Germany ....... 3218192

[51] Int. Cl.$^4$ .......................... F16D 3/12; F16H 45/02
[52] U.S. Cl. ................... 192/3.28; 192/70.2; 192/106.2; 464/63
[58] Field of Search ............. 192/3.27, 3.28, 3.29, 192/3.3, 3.31, 3.32, 70.17, 106.2, 70.19, 70.2; 464/63

[56] References Cited

U.S. PATENT DOCUMENTS

| | | | |
|---|---|---|---|
| 4,049,093 | 9/1977 | Vukovich et al. | 192/3.3 |
| 4,138,003 | 2/1979 | Malloy | 192/106.2 X |
| 4,299,315 | 11/1981 | Ohtsuka | 192/3.3 |
| 4,422,535 | 12/1983 | Ling | 192/3.28 |
| 4,461,376 | 7/1984 | Lech, Jr. et al. | 192/106.2 |
| 4,471,438 | 9/1984 | Futagi et al. | 192/3.28 X |

FOREIGN PATENT DOCUMENTS

| | | |
|---|---|---|
| 3047039-A1 | 9/1981 | Fed. Rep. of Germany . |
| 1389259 | 1/1965 | France . |
| 2066416 | 8/1981 | United Kingdom . |

Primary Examiner—Rodney H. Bonck
Assistant Examiner—Richard M. Lorence

Attorney, Agent, or Firm—Toren, McGeady and Goldberg

[57] ABSTRACT

The hydrodynamic coupling comprises a pump wheel and a turbine wheel arranged rotatably coaxially in relation to the pump wheel in a hydrodynamic fluid cycle. With the pump wheel a housing (4) is connected fast in rotation, through which an internal combustion engine drives the pump wheel. A controllable bridge-over clutch having a torsional vibration damper (1) is connected into the torque transmission path between the housing and a drive-output shaft coupled with the turbine wheel. The torsional vibration damper (1) comprises two damper units (2, 6, 10 and 3, 7, 11, 12) connected in series with one another into the torque transmission path. Each damper unit comprises a disc part (5 and 6) coaxial with the rotation axis and a cover part (10 and 11, 12) axially adjacent to the disc part and rotatable in relation thereto about the rotation axis through a limited angle, and several springs (2 and 3) retained in ports (8, 30 and 9, 31) of the disc part and of the cover part and stressable in the relative rotation of the disc part and of the cover part. The two damper units are coupled fast in rotation with one another through an axially loose plug-in connection (13) engaging by virtue of shape. The plug-in connection facilitates the assembling and examination of the torsional vibration damper before assembly. The plug-in connection is expediently formed by an internal profile of the radially outer disc part (6) and an external profile of the cover plate (11), grasping over the radially inner disc part (7) from the side remote from the housing, of the cover part (11, 12) of the radially inner damper unit.

5 Claims, 5 Drawing Figures

HYDRODYNAMIC COUPLING WITH SERIALLY ARRANGED DAMPER UNITS

BACKGROUND OF THE INVENTION

The invention relates to a hydrodynamic coupling, especially a hydrodynamic torque converter with a torsional vibration damper for a bridge-over force path of the hydrodynamic coupling.

A torque converter having a controllable bridgeover clutch with a torsional vibration damper is known for example from DE-A No. 3,047,039. The torsional vibration damper comprises two sets of helical springs which are arranged concentrically with one another on different diameters, two disc parts each with ports for the helical springs and laterally arranged cover plates likewise with ports provided for the helical springs. The helical springs are arranged in series in the force path. The outer set of helical springs is operatively connected with a housing component of the torque converter. The disc part holding the inner set of helical springs has the form of a hub flange and is operatively connected through a hub fast in rotation with an output shaft. The two sets of helical springs of this known torsional vibration damper are axially offset by adaption to the external contour of the torque converter and due to its general assembly. The damper comprises quite complicated components, for example sharply angled and greatly deep-drawn cover plates.

It is the primary object of the present invention to provide a torsional vibration damper for the above-stated purpose which is easy to produce and to assemble.

SUMMARY OF THE INVENTION

In accordance with the invention a pump wheel and a turbine wheel are coaxially arranged for relative rotation in a hydrodynamic fluid cycle. With the pump wheel a housing is connected fast in rotation, through which an internal combustion engine drives the pump wheel. A controllable bridge-over clutch with a torsional vibration damper is connected into the torque transmission path between the housing and a drive-output shaft coupled with the turbine wheel. The torsional vibration damper comprises two damper units connected in series with one another into the torque transmission path. Each of the two damper units comprises a disc part coaxial with the rotation axis and a cover part axially adjacent to the disc part and rotatable in relation thereto about the rotation axis through a limited angle, and several springs retained in ports of the disc part and of the cover part and stressable in the relative rotation of the disc part and of the cover part. The two damper units are coupled fast in rotation with one another through an axially loose plug-in connection engaging by virtue of shape. Due to the division of the torsional vibration damper into two damper units arranged concentrically with one another with an axially loose, key-type connection between the two units, it is possible to design and produce all individual parts simply, to achieve simple assembly and to inspect every individual unit of the vibration damper for correct function before installation.

The plug-in connection is preferably formed by an internal profile of the radially outer disc part and an external profile of the cover plate, grasping over the radially inner disc part from the side remote from the housing, of the cover part of the radially inner damper unit. Thus an especially favorable form is given for the axial offsetting of the two units of the torsional vibration damper. The two units of the torsional vibration damper are preferably provided vided with their own friction device which is realized by axial initial stressing of the cover parts in relation to the disc part and the hub flange respectively.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
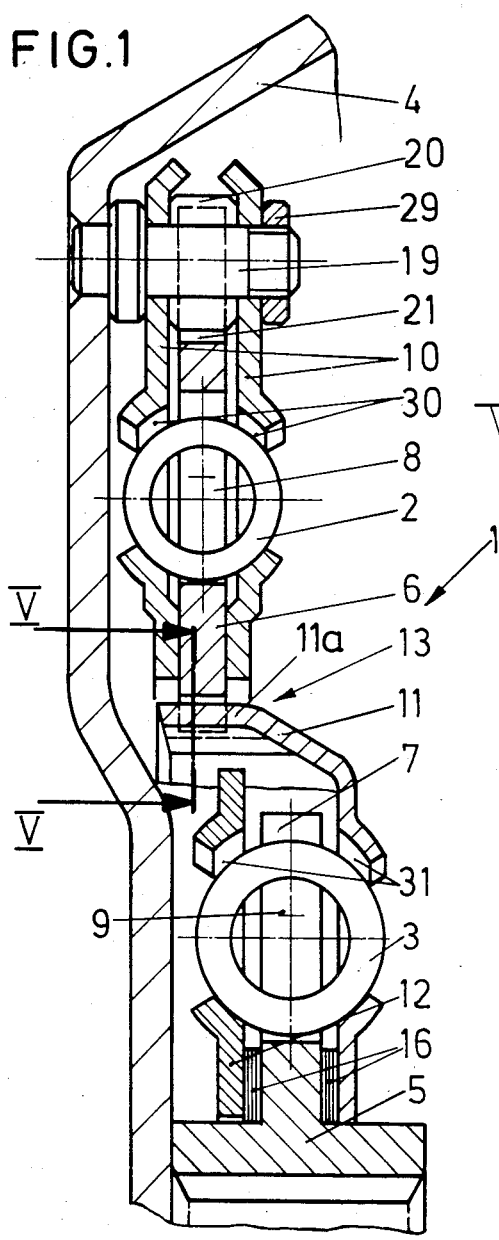
FIG. 1 shows a longitudinal sectional view through a torsional vibration damper.
Figure 2:
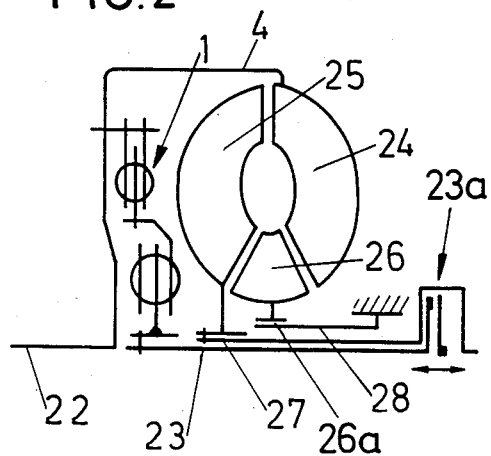
FIG. 2 shows a principle sketch of a hydrodynamic torque converter having integrated a torsional vibration damper.

FIG. 1 shows the assembly of a torsional vibration damper in a longitudinal section and FIG. 2 the situation of installation of the torsional vibration damper in a hydrodynamic torque converter. The torsional vibration damper 1 is secured directly to a housing component 4 of the hydrodynamic torque converter. The housing component 4 is firmly connected on the one hand with a crank shaft 22 of an internal combustion engine and on the other hand with a pump wheel 24 of the converter. In converter operation the torque from the crank shaft 22 is transmitted through the housing component 4 directly to a pump wheel 24, thence by way of the hydrodynamic fluid to a turbine wheel 25 and through a hollow shaft 27 to the transmission gear. In specific operational conditions it is desirable to bridge over the hydrodynamic torque converter, in order to improve efficiency, in which case the force path proceeds from the crank shaft 22 by way of the torsional vibration damper 1, a shaft 23 and a controllable friction clutch 23a to the transmission gear. However it is also possible to connect the torsional vibration damper 1 on the one hand through an operable friction clutch with the housing component 4 and on the other hand directly with the turbine wheel 25 or with the hollow shaft 27. In both embodiments the torsional vibration damper 1 ensures in the bridging over of the hydrodynamic torque converter that the torsional vibrations from the internal combustion engine and the irregularity of the torque transmission are forwarded in damped form to the transmission gear, since during the bridging over of the hydrodynamic torque converter the latter cannot effect the equalization. In the usual manner a guide wheel 26 is connected through a freewheel device 26a with a support 28 fast with the housing.

Figure 3:
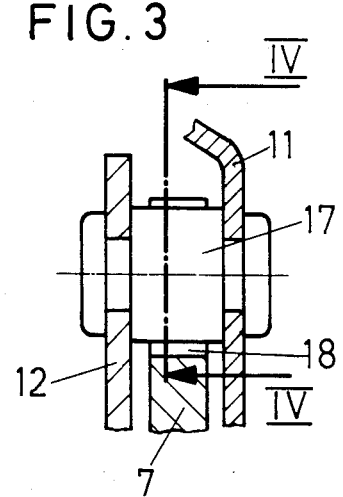
FIG. 3 shows a detail view of a radially inwardly lying damping unit of the torsional vibration damper.
Figure 4:
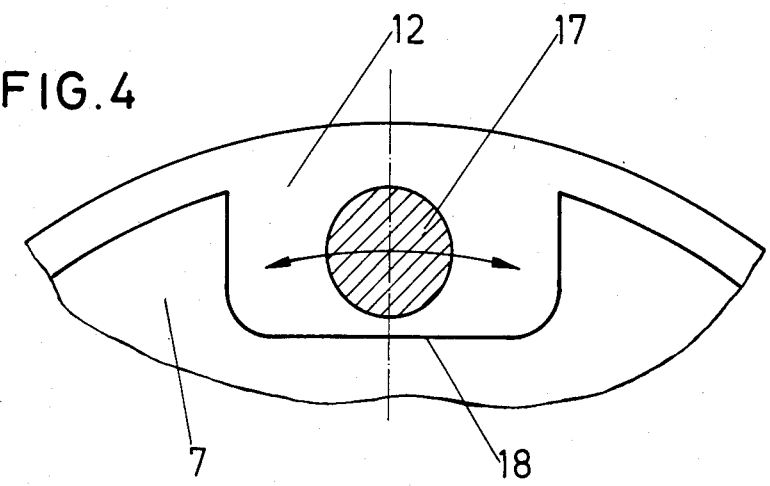
FIG. 4 shows a sectional view along the line IV—IV in FIG. 3.
Figure 5:
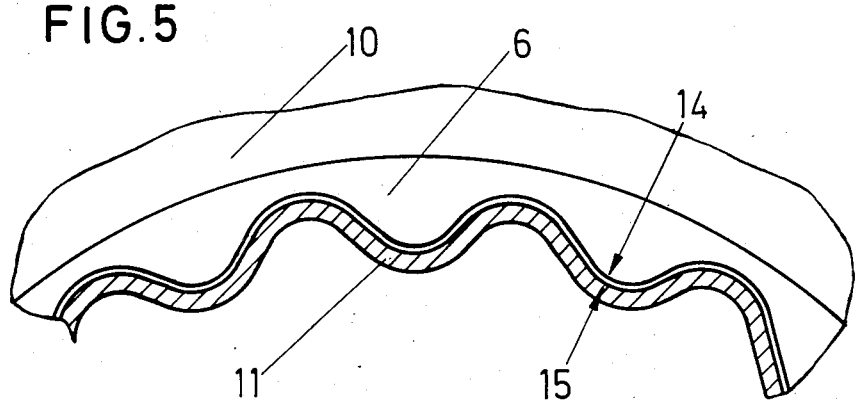
FIG. 5 shows a sectional view along the line V—V through a key-type connection according to FIG. 1.

The torsional vibration damper 1 comprises two sets of helical springs 2 and 3 which are arranged concentrically with one another on different diameters. Each set of helical springs is allocated to an independent damper unit of the torsional vibration damper. The radially outer unit consists of a set of springs 2 which are arranged in ports 8 of a disc part 6. On each of the two sides of the disc part 6 there is arranged a cover plate 10 which likewise comprises ports 30 to receive the springs 2. The cover plates 10 and the disc part 6 are prolonged radially outwards beyond the springs 2 and there connected through securing bolts 19 with the housing component 4, for the torque introduction. The securing bolts 19 pass through the cover plates 10, in appropriate openings, with interposition of an abutment roller 20 which on the one hand effects the spacing of the cover plates 10 from one another and on the other hand cooperates with ports 21 in the disc part 6 in order to fix the maximum damping angle of rotation of this unit of the torsional vibration damper. The securing bolts 19 are provided for example with nuts 29 for the securing of the cover plates 10. The two cover plates 10 are initially stressed in the direction towards the disc part 6 in order to generate a directed friction force on relative movement. The disc part 6 is formed to protrude radially inwards in relation to the cover plates 10, and constitutes a part of a key-type connection 13, in relation to the radially inwardly lying part of the torsional vibration damper. As represented in FIG. 5, here the disc part 6 engages with an internal profile 14 in the external profile 15 of one side wall 11a of the pot-shaped plate 11, remote from the housing, of the inwardly situated unit of the torsional vibration damper. The inwardly situated unit is in principle of the same construction as that lying radially outwards. It comprises two cover plates 11 and 12 which are arranged to both sides of a hub flange 7. The hub flange 7 has a hub 5 with which a rotation-fast connection is constituted in relation to the output shaft 23, according to FIG. 2. Springs 3 are arranged in ports 9 of the hub flange 7 and in ports 31 of the cover plates 11 and 12. The two cover plates 11 and 12 are connected with one another and kept spaced by distance rivets 17 according to FIG. 3. The cover plates are likewise initially stressed in the direction towards the hub flange 7 and act as friction devices having friction pads 16 interposed. The limited angle of rotation between the cover plates 11 and 12 and the hub flange 7 is predetermined by appropriate ports 18 in the hub flange in relation to the diameter of the distance rivets 17. FIG. 4 shows a sectional view along the line IV—IV in FIG. 3.

The torsional vibration damper operates as follows:

In the case of operation with bridging over of the torque converter the torque provided by the internal combustion engine drives the transmission gear via the torsional vibration damper 1. The torque is introduced via the housing component 4 through the securing bolts 19 into the two cover plates 10. From the cover plates 10 the forwarding of the torque takes place by way of the springs 2 to the end walls of the ports 8 in the disc part 6, from the disc part 6 by way of the key-type connection 13 to the cover plate 11, thence by way of the distance rivets 17 to the cover plate 12, thence by way of the springs 3 and the hub flange 7 to the hub 5 and the output shaft 23. The springs 3 have a flatter spring characteristic, that is they are softer than the springs 2, so that firstly the inwardly situated unit of the torsional vibration damper is subjected to torsion stress, while at the same time the friction device 11, 12, 16, 7 comes into action. Thus the radially outwardly situated unit of the torsional vibration damper is deflected either only slightly or not at all. After the abutment of the distance rivets 17 on the ports 18 of the hub flange 7 the radially inner unit of the torsional vibration damper is blocked and damping can now take place only by way of the radially outwardly situated unit. Here again a relative rotation results, according to the transmitted torque, between the disc part 6 and the cover plates 10, a friction force likewise having to be overcome. The maximum possible angle of rotation within the torsional vibration damper is then fixed by the abutment rollers 20 and the ports 21 in the disc part 6.

The two-part torsional vibration damper renders a simple assembly possible. The radially outer unit may be fitted in advance in the housing part 4. Both units of the torsional vibration damper can be provided with specifically adapted friction devices in order that the friction force may also be controlled in dependence upon the angle of rotation. The softer damper unit requires springs with larger diameter. Due to the arrangement of the softer damper unit radially inwards, the contour of the torsional vibration damper can advantageously be adapted to the external contour of the hydrodynamic torque converter. For this purpose the cover plate 11 is also deep-drawn in the axial direction to beyond the cover plate 12, which permits greater radii of deformation than if the cover plate 12 were to comprise this key-type connection 13.

While specific embodiments of the invention have been shown and described in detail to illustrate the application of the inventive principles, it will be understood that the invention may be embodied otherwise without departing from such principles. Especially the torsional vibration damper may be arranged on a housing component of the converter, which forms a part of the controllable bridge-over clutch.

What is claimed is:

1. Hydrodynamic coupling, comprising
   a pump wheel (24) drivable in rotation about a rotation axis,
   a turbine wheel (25) coupled fast in rotation with a drive-output shaft (27), said turbine wheel being arranged together with said pump wheel (24) rotatably coaxially in relation to said pump wheel (24) in a hydrodynamic fluid cycle,
   a housing (4) enclosing said turbine wheel (25) and connected fast in rotation with said pump wheel (24),
   a controllable bridge-over clutch (23a) connected into a torque transmission path betwwen said housing (4) and said drive-output shaft (27),
   a torsional vibration damper (1) arranged in said torque transmission path containing said bridge-over clutch (23a),
   wherein said torsional vibration damper (1) comprises two damper units (2, 6, 10; 3, 7, 11 12) arranged in series with one another in said torque transmission path, each of which comprises a separate disc part (6; 7) coaxial with said rotation axis, a cover part (10; 11, 12) axially adjacent to each said disc part (6; 7) and rotatable in relation thereto throught a limited angle about said axis of rotation, and several springs (2; 3) held in ports (8, 30; 9, 31) of each said disc part (6; 7) and of said cover part (10; 11, 12) and stressable in the relative rotation of each said disc part (6; 7) and said cover part (10; 11, 12), said springs (2) of a first (2, 6, 10) of said two damper units being arranged on a larger radius than said springs (3) of a second (3, 7, 11, 12) of said two damper units, and means are formed on said first damper unit (2, 6, 10) and on said second (3, 7, 11, 12) damper unit for the meshed interengement of said first damper unit with said second damper unit so that said first and second damper units are coupled for rotation with one another and said first damper unit and second damper unit being axially displaceable relative to one another.

2. Coupling according to claim 1, wherein said cover part (10) of said first damper unit (2, 6; 10) is secured to said housing (4), said disc part (6) of said first damper unit (2, 6, 10) has annular form and said means for meshed interengagement comprises a tooth-like internal profile (14) on the internal circumference of said disc part (6) of said first damper unit (2, 6, 10), and said cover part (11, 12) of said second damper unit (3, 7, 11, 12) comprises a circumferentially extending tooth-like external profile (15) in meshed engagement with said internal profile (14).

3. Coupling according to claim 2, characterized in that said cover part (11, 12) of said second damper unit (3, 7, 11, 12) comprises a substantially pot-shaped cover plate (11) arranged on a side of said disc part (7) of said second damper unit (3, 7, 11, 12) axially remote from said housing (4), wherein said pot-shaped cover plate has a side wall (11a) protruding axially of said housing (4) and traversing the external circumference of said disc part (7) of said second damper unit and wherein said side wall carries said external profile (15).

4. Coupling according to one of claim 1 to 3, characterized in that said disc part (7) of said second damper unit (3, 7, 11, 12) comprises a hub (5) for a rotation-fast, axially loose connection with a shaft (23) and is firmly connected, together with said springs (3) and said cover part (11, 12) to form a separate construction unit which can be assembled in said housing separately from a unit comprising said cover part (10), said spring (2) and said disc part for said first damper unit.

5. Coupling according to claim 1, characterized in that said bridge-over clutch (23a) is arranged in said torque transmission path between said second damper unit (3, 7, 11, 12) and said drive-output shaft (27).

* * * * *